United States Patent
Natanzon et al.

(10) Patent No.: US 9,135,119 B1
(45) Date of Patent: Sep. 15, 2015

(54) SYSTEM AND METHOD FOR DATA MANAGEMENT

(71) Applicant: EMC Corporation, Hopkinton, MA (US)

(72) Inventors: Assaf Natanzon, Tel Aviv (IL); Philip Derbeko, Modiin (IL); Anat Eyal, Tel Aviv (IL)

(73) Assignee: EMC CORPORATION, Hopkinton, MA (US)

( * ) Notice: Subject to any disclaimer, the term of this patent is extended or adjusted under 35 U.S.C. 154(b) by 433 days.

(21) Appl. No.: 13/630,699

(22) Filed: Sep. 28, 2012

(51) Int. Cl.
*G06F 11/00* (2006.01)
*G06F 11/14* (2006.01)
*G06F 11/16* (2006.01)

(52) U.S. Cl.
CPC ........ *G06F 11/1448* (2013.01); *G06F 11/1458* (2013.01); *G06F 11/1666* (2013.01); *G06F 11/1412* (2013.01)

(58) Field of Classification Search
CPC ............ G06F 11/1402; G06F 11/1412; G06F 11/1415; G06F 11/1446; G06F 11/1458; G06F 11/1469; G06F 11/1666; G06F 11/2089; G06F 11/2092; G06F 11/2097; G06F 11/1448
See application file for complete search history.

(56) References Cited

U.S. PATENT DOCUMENTS

| | | | |
|---|---|---|---|
| 5,644,701 A * | 7/1997 | Takewaki | 714/20 |
| 5,761,705 A * | 6/1998 | DeKoning et al. | 711/113 |
| 6,438,647 B1 * | 8/2002 | Nielson et al. | 711/113 |
| 6,567,889 B1 * | 5/2003 | DeKoning et al. | 711/114 |
| 7,003,688 B1 * | 2/2006 | Pittelkow et al. | 714/4.2 |
| 7,237,080 B2 * | 6/2007 | Green et al. | 711/162 |
| 7,849,350 B2 * | 12/2010 | French et al. | 714/3 |
| 8,307,154 B2 * | 11/2012 | Stabrawa et al. | 711/113 |
| 8,726,083 B1 * | 5/2014 | van der Goot | 714/19 |
| 8,935,488 B2 * | 1/2015 | Mizuno | 711/154 |
| 2003/0212864 A1 * | 11/2003 | Hicken et al. | 711/122 |
| 2004/0010666 A1 * | 1/2004 | Umbehocker et al. | 711/156 |
| 2007/0005915 A1 * | 1/2007 | Thompson et al. | 711/162 |
| 2007/0118693 A1 * | 5/2007 | Brannon et al. | 711/118 |
| 2011/0131187 A1 * | 6/2011 | Prahlad et al. | 707/674 |
| 2014/0012940 A1 * | 1/2014 | Joshi et al. | 709/214 |
| 2014/0059298 A1 * | 2/2014 | Olin et al. | 711/135 |
| 2014/0149698 A1 * | 5/2014 | Ezra et al. | 711/162 |

* cited by examiner

*Primary Examiner* — Marc Duncan
(74) *Attorney, Agent, or Firm* — Brian J. Colandreo; Mark H. Whittenberger; Holland & Knight LLP

(57) ABSTRACT

A method, computer program product, and computing system for generating a frontend snapshot of a primary frontend cache system at a particular point in time. A backend snapshot of a backend storage system coupled to the primary front end cache system is generated at the particular point in time. The front end snapshot of the primary frontend cache system is transferred to a backup frontend cache system.

21 Claims, 3 Drawing Sheets

SYSTEM AND METHOD FOR DATA MANAGEMENT

TECHNICAL FIELD

This disclosure relates to data systems and, more particularly, to systems and methods for managing data availability.

BACKGROUND

Storing and safeguarding electronic content is of paramount importance in modern business. Accordingly, various systems may be employed to protect such electronic content.

The use of solid-state storage devices is increasing in popularity. A solid state storage device is a content storage device that uses solid-state memory to store persistent content. A solid-state storage device may emulate (and therefore replace) a conventional hard disk drive. Additionally/alternatively, a solid state storage device may be used within a cache memory system. With no moving parts, a solid-state storage device largely eliminates (or greatly reduces) seek time, latency and other electromechanical delays and failures associated with a conventional hard disk drive.

SUMMARY OF DISCLOSURE

In a first implementation, a computer-implemented method includes generating a frontend snapshot of a primary frontend cache system at a particular point in time. A backend snapshot of a backend storage system coupled to the primary front end cache system is generated at the particular point in time. The front end snapshot of the primary frontend cache system is transferred to a backup frontend cache system.

One or more of the following features may be included. The primary frontend cache system may be a write-back primary front end cache system. The frontend snapshot may be initially stored on the primary frontend cache system. The frontend snapshot may be subsequently stored on the backup frontend cache system. Generating a backend snapshot of a backend storage system may include maintaining the backend storage system in a static state while the backend snapshot is generated. The backend storage system may include a data array. In the event of a failure of the primary frontend cache system, the backend storage system may be restored to the particular point in time using the backend snapshot and the backup frontend cache system may be restored to the particular point in time using the frontend snapshot.

In another implementation, a computer program product resides on a computer readable medium that has a plurality of instructions stored on it. When executed by a processor, the instructions cause the processor to perform operations including generating a frontend snapshot of a primary frontend cache system at a particular point in time. A backend snapshot of a backend storage system coupled to the primary front end cache system is generated at the particular point in time. The front end snapshot of the primary frontend cache system is transferred to a backup frontend cache system.

One or more of the following features may be included. The primary frontend cache system may be a write-back primary front end cache system. The frontend snapshot may be initially stored on the primary frontend cache system. The frontend snapshot may be subsequently stored on the backup frontend cache system. Generating a backend snapshot of a backend storage system may include maintaining the backend storage system in a static state while the backend snapshot is generated. The backend storage system may include a data array. In the event of a failure of the primary frontend cache system, the backend storage system may be restored to the particular point in time using the backend snapshot and the backup frontend cache system may be restored to the particular point in time using the frontend snapshot.

In another implementation, a computing system includes at least one processor and at least one memory architecture coupled with the at least one processor, wherein the computing system is configured to perform operations including generating a frontend snapshot of a primary frontend cache system at a particular point in time. A backend snapshot of a backend storage system coupled to the primary front end cache system is generated at the particular point in time. The front end snapshot of the primary frontend cache system is transferred to a backup frontend cache system.

One or more of the following features may be included. The primary frontend cache system may be a write-back primary front end cache system. The frontend snapshot may be initially stored on the primary frontend cache system. The frontend snapshot may be subsequently stored on the backup frontend cache system. Generating a backend snapshot of a backend storage system may include maintaining the backend storage system in a static state while the backend snapshot is generated. The backend storage system may include a data array. In the event of a failure of the primary frontend cache system, the backend storage system may be restored to the particular point in time using the backend snapshot and the backup frontend cache system may be restored to the particular point in time using the frontend snapshot.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
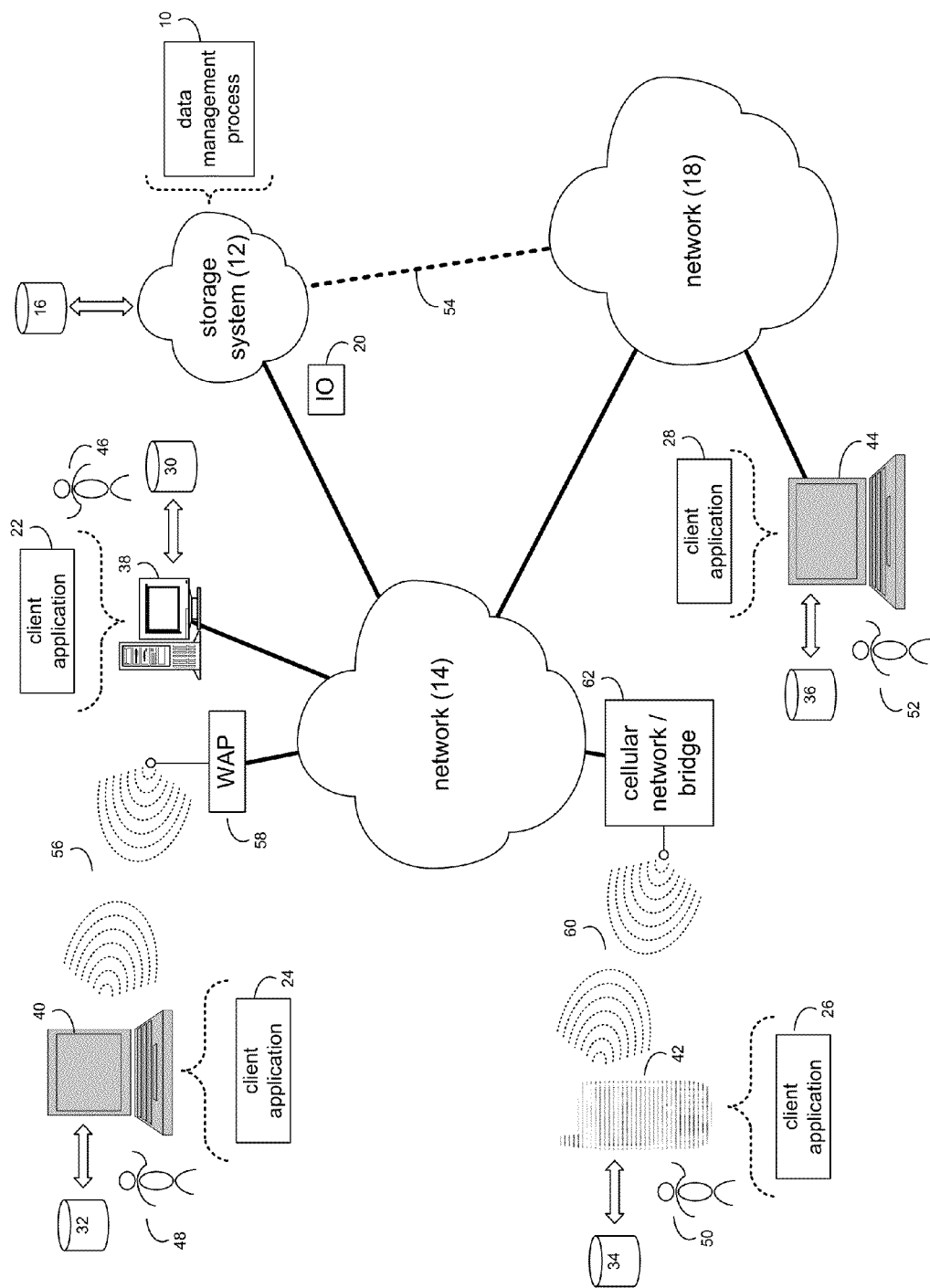
FIG. 1 is a diagrammatic view of a storage system and a data management process coupled to a distributed computing network.

System Overview:

Referring to FIG. 1, there is shown data management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows XP Server™; Novell Netware™ Redhat Linux™, Unix, or a custom operating system, for example.

The instruction sets and subroutines of data management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

Client electronic devices 38, 40, 42, 44 may each execute an operating system, examples of which may include but are not limited to Microsoft Windows™, Microsoft Windows CE™, Redhat Linux™, or a custom operating system.

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure. For example and as discussed above, storage system 12 may be a personal computer that includes a single electro-mechanical storage device.

Figure 2:
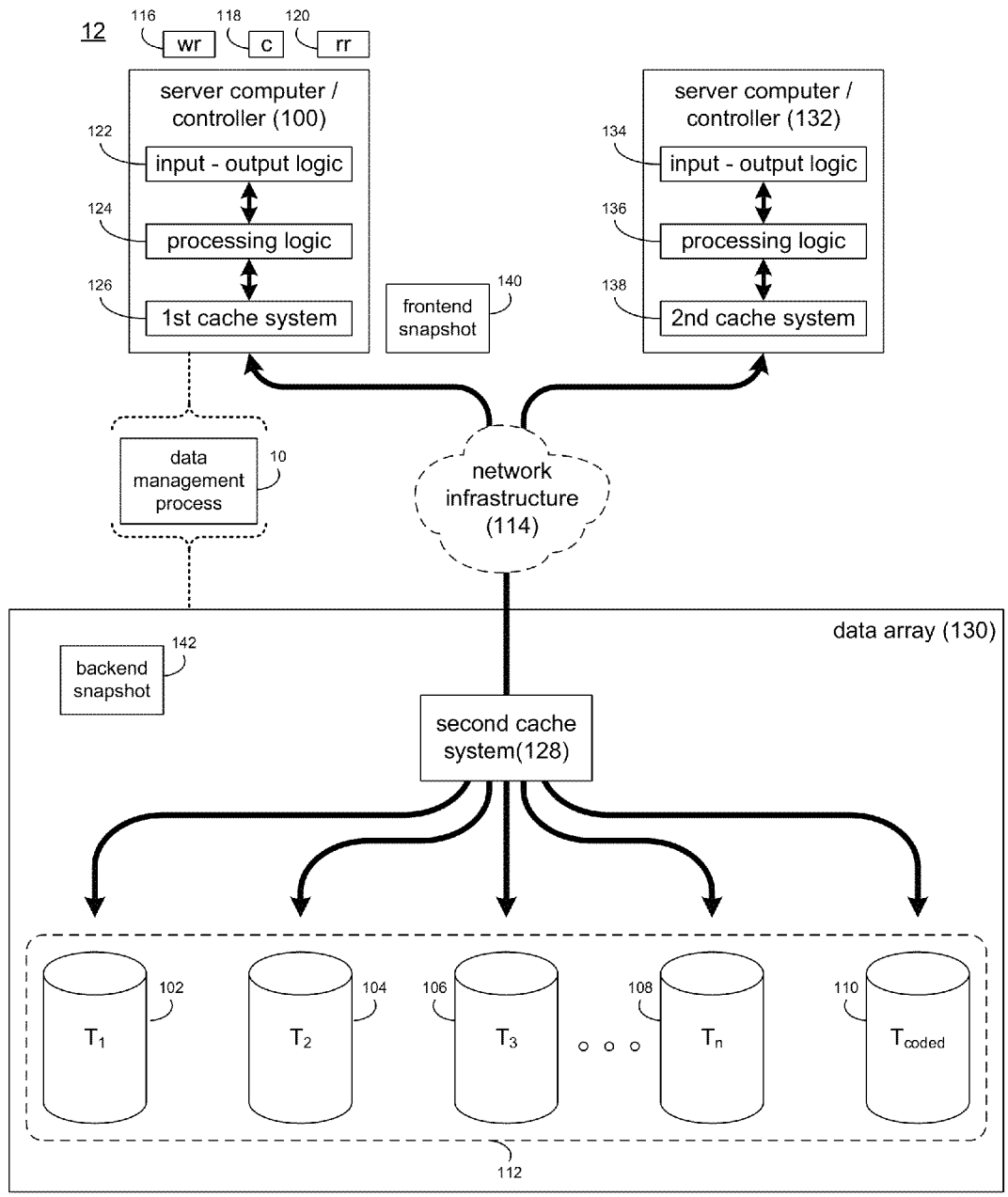
FIG. 2 is a diagrammatic view of the storage system of FIG. 1.

Referring also to FIG. 2, storage system 12 may include a server computer/controller (e.g. server computer/controller 100), and a plurality of storage targets $T_{1-n}$ (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for illustrative purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives, wherein a combination of storage targets 102, 104, 106, 108 and coded target 110 may form non-volatile, electro-mechanical memory system 112.

The manner in which storage system 12 is implemented may vary depending upon e.g. the level of redundancy/performance/capacity required. For example, storage system 12 may be a RAID device in which server computer/controller 100 is a RAID controller card and storage targets 102, 104, 106, 108 and/or coded target 110 are individual "hot-swappable" hard disk drives. An example of such a RAID device may include but is not limited to an NAS device. Alternatively, storage system 12 may be configured as a SAN, in which server computer/controller 100 may be e.g., a server computer and each of storage targets 102, 104, 106, 108 and/or coded target 110 may be a RAID device and/or computer-based hard disk drive. Further still, one or more of storage targets 102, 104, 106, 108 and/or coded target 110 may be a SAN.

In the event that storage system 12 is configured as a SAN, the various components of storage system 12 (e.g. server computer/controller 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of data management process 10. The instruction sets and subroutines of data management process 10, which may be stored on a storage device (e.g., storage device 16) coupled to server computer/controller 100, may be executed by one or more processors (not shown) and one or more memory architectures (not shown) included within server computer/controller 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when server computer/controller 100 is configured as an application server, these IO requests may be internally generated within server computer/controller 100. Examples of IO request 20 may include but are not limited to data write request 116 (i.e. a request that content 118 be written to storage system 12) and data read request 120 (i.e. a request that content 118 be read from storage system 12).

Server computer/controller 100 may include input-output logic 122 (e.g., a network interface card or a Host Bus Adaptor (HBA)), processing logic 124, and first cache system 126. Examples of first cache system 126 may include but are not limited to a volatile, solid-state, cache memory system (e.g., a dynamic RAM cache memory system) and/or a non-volatile, solid-state, cache memory system (e.g., a flash-based, cache memory system).

During operation of server computer/controller 100, content 118 to be written to storage system 12 may be received by input-output logic 122 (e.g. from network 14 and/or network 18) and processed by processing logic 124. Additionally/alternatively and when server computer/controller 100 is configured as an application server, content 118 to be written to storage system 12 may be internally generated by server computer/controller 100. As will be discussed below in greater detail, processing logic 124 may initially store content 118 within first cache system 126.

Depending on the manner in which first cache system 126 is configured, processing logic 124 may immediately write content 118 to second cache system 128/non-volatile, electro-mechanical memory system 112 (if first cache system 126 is configured as a write-through cache) or may subsequently write content 118 to second cache system 128/non-volatile, electro-mechanical memory system 112 (if first cache system 126 is configured as a write-back cache). Additionally and in certain configurations, processing logic 124 may calculate and store coded data on coded target 110 (included within non-volatile, electromechanical memory system 112) that may allow for the regeneration of data lost/corrupted on one or more of storage targets 102, 104, 106, 108. For example, if processing logic 124 was included within a RAID controller card or an NAS/SAN controller, processing logic 124 may calculate and store coded data on coded target 110. However, if processing logic 124 was included within e.g., an applications server, data array 130 may calculate and store coded data on coded target 110.

Examples of second cache system 128 may include but are not limited to a volatile, solid-state, cache memory system (e.g., a dynamic RAM cache memory system) and/or a non-volatile, solid-state, cache memory system (e.g., a flash-based, cache memory system).

The combination of second cache system 128 and non-volatile, electromechanical memory system 112 may form data array 130, wherein first cache system 126 may be sized so that the number of times that data array 130 is accessed may be reduced. Accordingly, by sizing first cache system 126 so that first cache system 126 retains a quantity of data sufficient to satisfy a significant quantity of IO requests (e.g., IO request 20), the overall performance of storage system 12 may be enhanced.

Further, second cache system 128 within data array 130 may be sized so that the number of times that non-volatile, electromechanical memory system 112 is accessed may be reduced. Accordingly, by sizing second cache system 128 so that second cache system 128 retains a quantity of data sufficient to satisfy a significant quantity of IO requests (e.g., IO request 20), the overall performance of storage system 12 may be enhanced.

As discussed above, the instruction sets and subroutines of data management process 10, which may be stored on storage device 16 included within storage system 12, may be executed by one or more processors (not shown) and one or more memory architectures (not shown) included within storage system 12. Accordingly, in addition to being executed on server computer/controller 100, some or all of the instruction sets and subroutines of data management process 10 may be executed by one or more processors (not shown) and one or more memory architectures (not shown) included within data array 130.

The Data Management Process:

As discussed above, depending on the manner in which first cache system 126 is configured, processing logic 124 may immediately write content 118 to second cache system 128/non-volatile, electro-mechanical memory system 112 (if first cache system 126 is configured as a write-through cache) or may subsequently write content 118 to second cache system 128/non-volatile, electro-mechanical memory system 112 (if first cache system 126 is configured as a write-back cache).

Assume for illustrative purposes that first cache system 126 is configured as a write-back cache system. Accordingly, in the event of a failure of server computer/controller 100, there may be a discrepancy between the content of first cache system 126 and the content of second cache system 128/non-volatile, electro-mechanical memory system 112 (as some data within first cache system 126 may not yet have been written back to second cache system 128/non-volatile, electro-mechanical memory system 112). Accordingly, data management process 10 may be configured to address such a failure and rectify such a data discrepancy.

Figure 3:
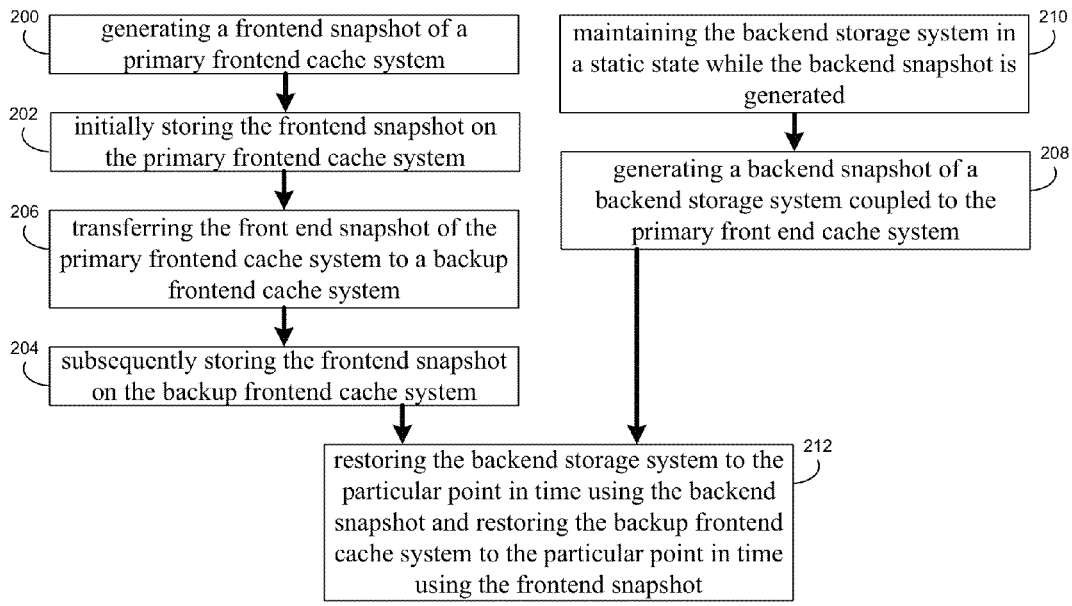
FIG. 3 is a flow chart of one implementation of the data management process of FIG. 1.

Referring also to FIG. 3, assume that backup server computer/controller 132 is configured to be activated by data management process 10 in the event of a failure of the primary server computer/controller (e.g., server computer/controller 100). Backup server computer/controller 132 may include input-output logic 134 (e.g., a network interface card or a Host Bus Adaptor (HBA)), processing logic 136, and second cache system 138. Examples of second cache system 138 may include but are not limited to a volatile, solid-state, cache memory system (e.g., a dynamic RAM cache memory system) and/or a non-volatile, solid-state, cache memory system (e.g., a flash-based, cache memory system).

During normal operation of server computer/controller 100, data management process 10 may generate 200 frontend snapshot 140 of a primary frontend cache system (e.g., first cache system 126) at a particular point in time. This particular point in time may be e.g., every hour, every six hours, or every day. The more frequently the snapshots are made, the smaller the quantity of cached data that would be lost in the event of a server computer/controller failure. Frontend snapshot 140 may be a complete copy of the entire contents of e.g., first cache system 126. Accordingly, if first cache system 126 is one gigabyte of flash cache, frontend snapshot 140 may be one gigabyte in size.

Alternatively, frontend snapshot 140 may not be a complete copy of the entire contents of e.g., first cache system 126. For example, frontend snapshot 140 may only include the data that is in first cache system 126 due to the processing of write requests (thus representing the updated data). Accordingly, data that is in first cache system 126 due to the processing of read requests may be skipped, as that data is already present in data array 130, thus reducing the overall size of frontend snapshot 140.

Data management process 10 may initially store 202 frontend snapshot 140 on the primary frontend cache system (e.g., first cache system 126). This initial storing 202 of frontend snapshot 140 on the primary frontend cache system (e.g., first cache system 126) may occur while e.g., frontend snapshot 140 is being generated 200. Accordingly, once the generation 200 of frontend snapshot 140 is completed, data management process 10 may subsequently store 204 frontend snapshot 140 on the backup frontend cache system (e.g., second cache system 138) of backup server computer/controller 132. Accordingly, data management process 10 may transfer 206 frontend snapshot 140 of the primary frontend cache system (e.g., first cache system 126) to the backup frontend cache system (e.g., second cache system 138) of backup server computer/controller 132.

Data management process 10 may generate 208 backend snapshot 142 of a backend storage system (e.g., data array 130) that is coupled to the primary front end cache system (e.g., first cache system 126). As discussed above, data array 130 includes second cache system 128 and non-volatile, electro-mechanical memory system 112. Generation 208 of backend snapshot 142 may occur at the same particular point in time at which frontend snapshot 140 was produced; and backend snapshot 142 may be stored on the backend storage system (e.g., data array 130).

For example, if frontend snapshot 140 was generated 200 at midnight on 1 Jan. 2012, backend snapshot 142 would be generated 208 at the same time. Accordingly, the combination of frontend snapshot 140 and backend snapshot 142 would give a complete representation of the contents of the combination of the primary frontend cache system (e.g., first cache system 126) and the backend storage system (e.g., data array 130) at midnight on 1 Jan. 2012.

When generating 208 backend snapshot 142 of the backend storage system (e.g., data array 130), data management process 10 may maintain 210 the backend storage system (e.g., data array 130) in a static state while backend snapshot 142 is being generated 208. For example, data management process 10 may prevent any server computer/controller (including server computers/controllers 100, 132) from writing data to and/or deleting data from data array 130. Accordingly, backend snapshot 142 will be an accurate representation of data array 130 at (in this example) midnight on 1 Jan. 2012.

In the event of a failure of the primary frontend cache system (e.g., first cache system 126), data management process 10 may restore 212 the backend storage system (e.g., data array 130) to the particular point in time (e.g., midnight on 1 Jan. 2012) using backend snapshot 142 and restore 212 the backup frontend cache system (e.g., second cache system 138) to the particular point in time (e.g., midnight on 1 Jan. 2012) using frontend snapshot 140.

Specifically and for this example, assume that server computer/controller 100 suffers a catastrophic failure and is no longer functional. Accordingly, upon identifying the failure (i.e., the unavailability of server computer/controller 100 and, therefore, first cache system 126), data management process 10 may initiate the above-described data restoration process. For example, data management process 10 may obtain the latest versions of frontend snapshot 140 and backend snapshot 142. As discussed above, frontend snapshot 140 may be stored 204 on the backup frontend cache system (e.g., second cache system 138) of backup server computer/controller 132. Further and as discussed above, backend snapshot 142 may be stored on the backend storage system (e.g., data array 130). Through the use of snapshots 140, 142, data management process 10 may restore 212 the backend storage system (e.g., data array 130) to the particular point in time (e.g., midnight on 1 Jan. 2012) using backend snapshot 142 and may restore 212 the backup frontend cache system (e.g., second cache system 138) to the particular point in time (e.g., midnight on 1 Jan. 2012) using frontend snapshot 140.

Accordingly, the data included within frontend snapshot 140 may be used to populate the cache of the backup frontend cache system (e.g., second cache system 138) of backup server computer/controller 132. Further, the data included within backend snapshot 142 may be used to populate the backend storage system (e.g., data array 130). Accordingly, the content of the combination of the backup frontend cache system (e.g., second cache system 138) and the backend storage system (e.g., data array 130) will be reset to as they were at the particular point in time that snapshot 140, 142 were made, namely (in this example) midnight on 1 Jan. 2012.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
    generating a frontend snapshot of a primary frontend cache system at a particular point in time;
    generating a backend snapshot of a backend storage system coupled to the primary front end cache system at the particular point in time;
    transferring the front end snapshot of the primary frontend cache system to a backup frontend cache system; and
    removing the front end snapshot from the primary front end cache system subsequent to transferring the front end snapshot.

2. The computer-implemented method of claim 1 wherein the primary frontend cache system is a write-back primary front end cache system.

3. The computer-implemented method of claim 1 further comprising:
    initially storing the frontend snapshot on the primary frontend cache system.

4. The computer-implemented method of claim 1 further comprising:

subsequently storing the frontend snapshot on the backup frontend cache system.

5. The computer-implemented method of claim 1 wherein generating a backend snapshot of a backend storage system includes:
maintaining the backend storage system in a static state while the backend snapshot is generated.

6. The computer-implemented method of claim 1 wherein the backend storage system includes a data array.

7. The computer-implemented method of claim 1 further comprising:
in the event of a failure of the primary frontend cache system, restoring the backend storage system to the particular point in time using the backend snapshot and restoring the backup frontend cache system to the particular point in time using the frontend snapshot.

8. A computer program product residing on a non-transitory computer readable medium having a plurality of instructions stored thereon which, when executed by a processor, cause the processor to perform operations comprising:
generating a frontend snapshot of a primary frontend cache system at a particular point in time;
generating a backend snapshot of a backend storage system coupled to the primary front end cache system at the particular point in time;
transferring the front end snapshot of the primary frontend cache system to a backup frontend cache system; and
removing the front end snapshot from the primary front end cache system subsequent to transferring the front end snapshot.

9. The computer program product of claim 8 wherein the primary frontend cache system is a write-back primary front end cache system.

10. The computer program product of claim 8 further comprising instructions for:
initially storing the frontend snapshot on the primary frontend cache system.

11. The computer program product of claim 8 further comprising instructions for:
subsequently storing the frontend snapshot on the backup frontend cache system.

12. The computer program product of claim 8 wherein the instructions for generating a backend snapshot of a backend storage system include instructions for:
maintaining the backend storage system in a static state while the backend snapshot is generated.

13. The computer program product of claim 8 wherein the backend storage system includes a data array.

14. The computer program product of claim 8 further comprising instructions for:
in the event of a failure of the primary frontend cache system, restoring the backend storage system to the particular point in time using the backend snapshot and restoring the backup frontend cache system to the particular point in time using the frontend snapshot.

15. A computing system including at least one processor and at least one memory architecture coupled with the at least one processor, wherein the computing system is configured to perform operations comprising:
generating a frontend snapshot of a primary frontend cache system at a particular point in time;
generating a backend snapshot of a backend storage system coupled to the primary front end cache system at the particular point in time;
transferring the front end snapshot of the primary frontend cache system to a backup frontend cache system; and
removing the front end snapshot from the primary front end cache system subsequent to transferring the front end snapshot.

16. The computing system of claim 15 wherein the primary frontend cache system is a write-back primary front end cache system.

17. The computing system of claim 15 further configured to perform operations comprising:
initially storing the frontend snapshot on the primary frontend cache system.

18. The computing system of claim 15 further configured to perform operations comprising:
subsequently storing the frontend snapshot on the backup frontend cache system.

19. The computing system of claim 15 wherein generating a backend snapshot of a backend storage system includes:
maintaining the backend storage system in a static state while the backend snapshot is generated.

20. The computing system of claim 15 wherein the backend storage system includes a data array.

21. The computing system of claim 15 further configured to perform operations comprising:
in the event of a failure of the primary frontend cache system, restoring the backend storage system to the particular point in time using the backend snapshot and restoring the backup frontend cache system to the particular point in time using the frontend snapshot.

* * * * *